United States Patent [19]

Warburg

[11] Patent Number: 4,594,032

[45] Date of Patent: Jun. 10, 1986

[54] DOWEL JIG

[75] Inventor: Joseph H. Warburg, Monsey, N.Y.

[73] Assignee: Arco Products Corp, Englewood, N.J.

[21] Appl. No.: 505,593

[22] Filed: Jun. 20, 1983

[51] Int. Cl.$^4$ .............................................. B23B 47/28
[52] U.S. Cl. .................................. 408/115 R; 408/72 R
[58] Field of Search ................... 29/26 A; 408/115 R, 408/97, 72 R, 72 B, 241 G, 241 B, 115 B; 33/185 R, 189, 174 G

[56] References Cited

U.S. PATENT DOCUMENTS

| | | | |
|---|---|---|---|
| 581,811 | 5/1897 | Coyle | 408/115 R |
| 917,488 | 4/1909 | Roberts | 408/115 R |
| 1,097,153 | 5/1914 | Wolgamood | 408/115 |
| 1,153,841 | 9/1915 | Earle | 408/115 |
| 2,556,131 | 6/1951 | Wolfson | 408/115 R |
| 2,583,283 | 1/1952 | Volz | 408/115 X |
| 2,602,238 | 7/1952 | Wellman | 408/115 X |
| 2,930,263 | 3/1960 | Jones | 408/115 |
| 3,008,359 | 11/1961 | Mackey | 408/115 R |
| 3,464,296 | 9/1969 | Harper | 408/115 R |
| 3,708,237 | 1/1973 | Kruse | 408/115 R X |
| 3,914,871 | 10/1975 | Wolff | 408/115 R X |
| 4,137,003 | 1/1979 | Budoff | 408/115 R X |
| 4,145,160 | 3/1979 | Wiggins | 408/103 |
| 4,153,384 | 5/1979 | Isaken | 408/115 R |
| 4,176,989 | 12/1979 | Wolff | 408/115 R |
| 4,194,861 | 3/1980 | Keller | 408/241 B X |
| 4,294,567 | 10/1981 | Wiggins | 408/72 R |

FOREIGN PATENT DOCUMENTS

| | | | |
|---|---|---|---|
| 2750869 | 5/1979 | Fed. Rep. of Germany | 408/241 B |
| 2240799 | 3/1975 | France | 408/115 |
| 1314809 | 4/1973 | United Kingdom | 408/115 |
| 2071537 | 9/1981 | United Kingdom | 408/115 R |

Primary Examiner—William R. Briggs
Attorney, Agent, or Firm—Blum Kaplan Friedman Silberman & Beran

[57] ABSTRACT

A multi-purpose dowel jig for positioning first and second workpieces to permit the drilling of corresponding dowel holes therein. The dowel jig includes a first member having a flat surface and a wall extending essentially perpendicular to the flat surface. The wall includes at least one bore hole therein which defines an axis extending essentially parallel to the flat surface. A second member or slide jig is slideably supported on the first member adjacent the flat surface and is slideable in the direction of the axis. The second member includes an upper surface facing the flat surface of the first member. The second member includes at least second and third bore holes therein. The second and third bore holes each define an axis with the axes of the second and third bore holes extending essentially perpendicular to and intersecting the axis of the first bore hole in the first member. A locking member is provided to releasably lock the second member at a desired position with respect to the wall of the first member. The second member is preferably removable from the first member for use in recessed doweling.

19 Claims, 5 Drawing Figures

DOWEL JIG

BACKGROUND OF THE INVENTION

The present invention is directed to a dowel jig and, in particular, to a multi-purpose dowel jig with combined vise and removable slide jig which can be utilized to position corresponding dowel holes in two workpieces or boards for edge-to-edge doweling, L-doweling and recessed or T-doweling.

Over the years, various proposals for dowel jig constructions have been put forth and several have been put into practical use. Dowel jigs are utilized to accurately align corresponding dowel holes in workpieces such as wood boards or the like to permit the workpieces to be joined together by dowels. For example, where boards are to be joined together along opposing edges for use as a table top or the like, it is necessary that the holes drilled in one edge of a first board be accurately aligned with holes drilled in an edge of a second board so that when the boards are joined together by dowels, the surface and edges presented thereby are substantially flat. In addition, accurate positioning of corresponding holes is required where boards are to be joined so that they are substantially perpendicular to one another such as to form an L-shape or a T-shape for bookcases, cabinets or similar constructions.

It would prove extremely desirable to craftsmen, carpenters and/or cabinet makers to use a dowel jig for easy drilling of accurately aligned dowel holes and/or if a single tool could be utilized for drilling matching dowel holes in workpieces regardless of the manner in which the workpieces are to be joined. Accordingly, the present invention provides a dowel jig which meets these requirements by providing a dowel jig tool which can be utilized in aligning corresponding holes in workpieces to be joined in edge-to-edge doweling, L-doweling and recessed or T-doweling.

SUMMARY OF THE INVENTION

Generally speaking, in accordance with the present invention, a dowel jig for positioning first and second workpieces for drilling corresponding dowel holes therein is provided. The dowel jig includes a first member or frame having a flat surface and an upstanding wall extending perpendicular to the flat surface. The wall includes at least a first bore hole therein defining an axis. A second member or slide jig having at least second and third bore holes therein is removably slideably supported on the first member. The axes defined by the second and third bore holes lie substantially perpendicular to and intersect the axis of the first bore hole. A locking member is provided for releaseably locking the second member at a predetermined position with respect to the first member so that boards of varying thicknesses can be accommodated by the dowel jig.

In a preferred embodiment, the second slideable member is removable from the first member and is utilized to form matching aligned holes in an interior surface portion of a second board for recessed or T-doweling. The first member may include a threaded vise member for clamping a board or boards between the wall of the first member and the vise face.

As part of a preferred embodiment, three sets of different bore holes of approximate thicknesses $\frac{1}{4}''$, $5/16''$ and $\frac{3}{8}''$ may be provided on the upstanding wall and on opposite sides of an imaginary base line of the second member for boards $\frac{1}{2}$ to $\frac{5}{8}''$ thickness, boards $\frac{5}{8}$ to $\frac{3}{4}''$ thickness and boards $\frac{3}{4}$ to $1''$ thickness, respectively, although it is noted that other sizes can be used in the invention. Corresponding bore holes in the wall and the second member are of equal diameter for the drilling of equal sized holes in the edges and surfaces of boards to be doweled together. A removable pin may be utilized to properly position the second member with respect to the first member according to the thickness of the workpieces to be drilled to insure accurate alignment of the bore holes with respect to the workpieces.

Accordingly, it is an object of the present invention to provide an improved dowel jig.

Another object of the present invention is to provide a dowel jig which can be utilized for edge-to-edge doweling, L-doweling and recessed or T-doweling.

A further object of the present invention is to provide a multi-purpose dowel jig which is easy and inexpensive to manufacture and which is readily useable by both the skilled artisan and the unskilled to insure accurate alignment of dowel holes in workpieces.

Yet another object of the present invention is to provide an improved dowel jig which includes a removable slide jig which is utilized for recessed doweling.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
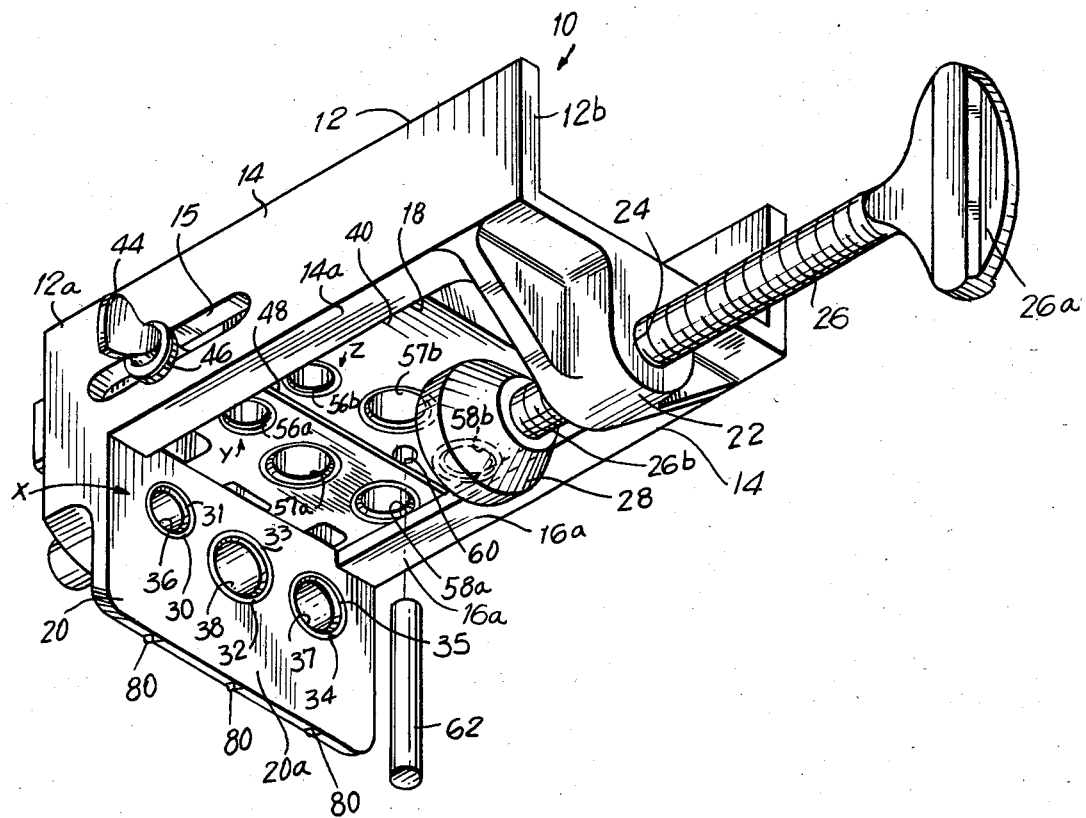
FIG. 1 is a perspective view of a dowel jig constructed in accordance with a preferred embodiment of the present invention.

Reference is made to FIGS. 1 through 4 which depict a dowel jig, generally indicated at 10, constructed in accordance with a preferred embodiment of the present invention. Dowel jig 10 includes a first member or frame 12 having two opposing rails 14 and 16 which extend substantially perpendicular to one another and which define a cut-out portion 18 therebetween. The upper surfaces 14a and 16a of rails 14 and 16 define substantially flat surfaces. A first end 12a of frame 12 includes an upstanding wall 20 which extends perpendicular to surfaces 14a and 16a of rails 14 and 16, respectively. Second end 12b of frame 12 includes a portion 22 extending in the direction of wall 20 and includes a threaded opening 24 therein. A screw 26 is threaded in threaded opening 24 and includes a first shaped end 26a and a second end 26b having supported thereon a swivel washer 28 to allow for safe clamping of workpieces which are non-flat or have uneven surfaces. Screw 26 extends perpendicular to wall 20 of frame 12 so that inner surface 20a of wall 20 and surface 28a of member 28 define parallel surfaces between which a board or boards can be readily clamped.

Wall 20 includes a first set, designated as X, of three bore holes 30, 32 and 34 formed therein. Bushings 31, 33 and 35 are fitted and secured in openings 30, 32 and 34, respectively. Bushing 31 defines an opening 36 which is about ¼" in diameter. Bushing 35 defines an opening 37 which is about 5/16" in diameter. Bushing 33 defines an opening 38 which is about ⅜" in diameter. These sizes are selected since preferred sizes for dowels are ¼", 5/16" and ⅜" diameters, although it is noted that other sizes of dowels and corresponding diameters for the openings may be utilized in the present invention.

A second member or slide jig 40 is slideably supported between rails 14 and 16 and against the underside of surfaces 14a and 16a thereof. A threaded opening 42 is provided on one side edge 40a of second member 40. A corresponding slot 15 is formed in rail 14 of frame 12 so that opening 42 remains exposed therethrough. A threaded thumb screw 44 extends through slot 15 and is threaded in threaded opening 42. Screw 44 is utilized to lock slide member 40 in a desired position along rail 14. In this regard, a lock washer 46 may be provided for insuring a locking fit when screw 44 presses against the walls defining slot 15 to insure a locked position for slide jig 40.

Slide jig 40 includes an imaginary base line which may be in the form of a groove 48 formed therein and extending transversely thereacross. Provided on opposite sides of base line 48 are two sets, designated as Y and Z, respectively, of corresponding holes 50a and 50b, 52a and 52b, and 54a and 54b. Appropriately sized bushings 51, 53 and 55 are fixed and secured in respective openings 50a and 50b, 52a and 52b and 54a and 54b. Bushings 51 define openings 56a and 56b of about ¼" in diameter. Bushings 53 define openings 57a and 57b of about ⅜" in diameter. Bushings 55 define openings 58a and 58b of about 5/16" in diameter. The axes of openings 56a and 56b on slide member 40 extend perpendicular to and intersect the axis of opening 36 on wall 20 of frame 12. Similarly, the axes of openings 57a and 57b extend perpendicular to and intersect the axis of opening 38. Likewise, the axes of openings 58a and 58b in slide member 40 extend perpendicular to and intersect the axis of opening 37 in wall 20.

An opening 60 is provided in slide jig 40 and is positioned adjacent base line 48. A pin 62 is removably securable in opening 60, the purpose of which will be described below in detail. The centers of the holes in set X are spaced from surfaces 14a and 16a and the centers of the holes in sets Y and Z are spaced from base line 48 to insure proper centering of holes drilled in workpieces.

Figure 2:
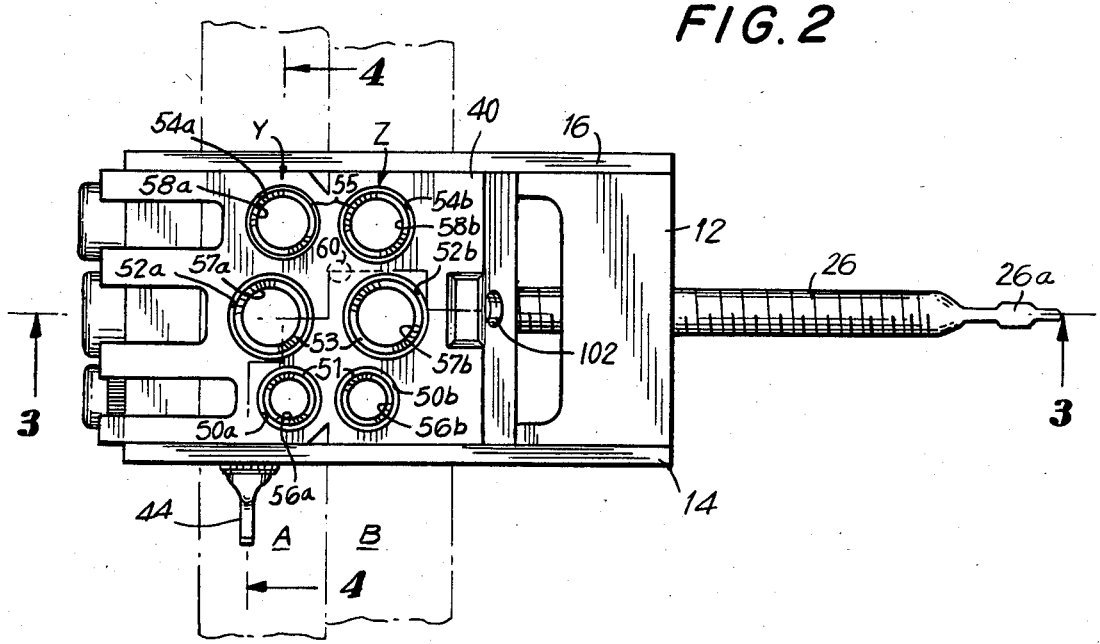
FIG. 2 is a top plan view of the dowel jig depicted in FIG. 1.
Figure 3:
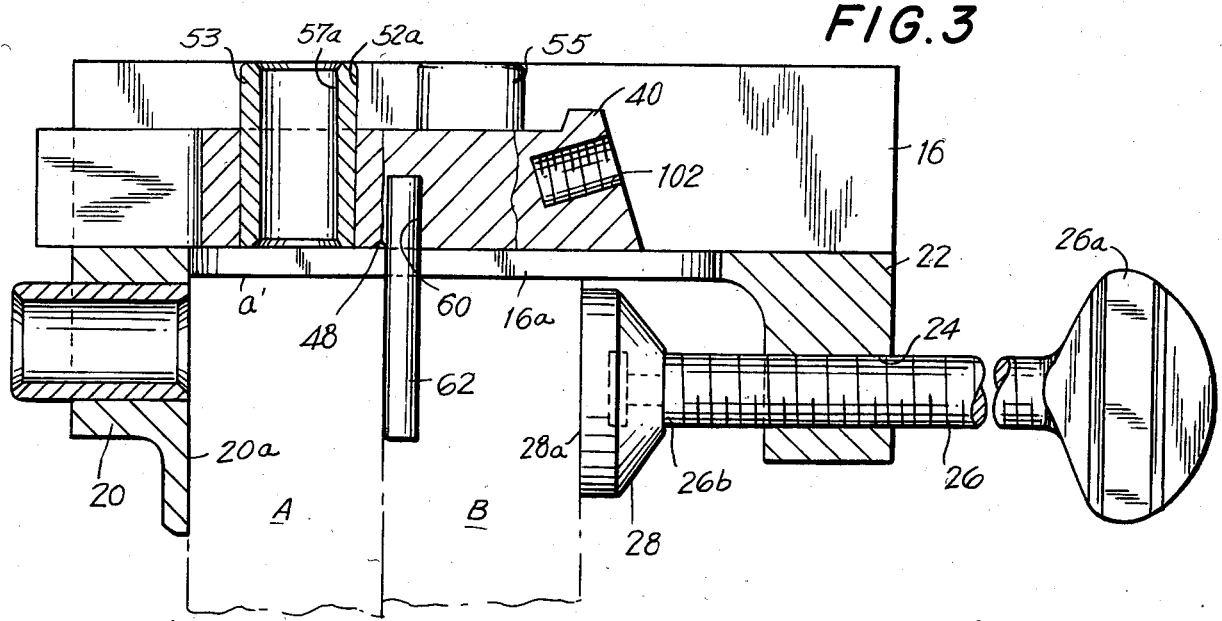
FIG. 3 is an enlarged sectional view taken along line 3—3 of FIG. 2.
Figure 4:
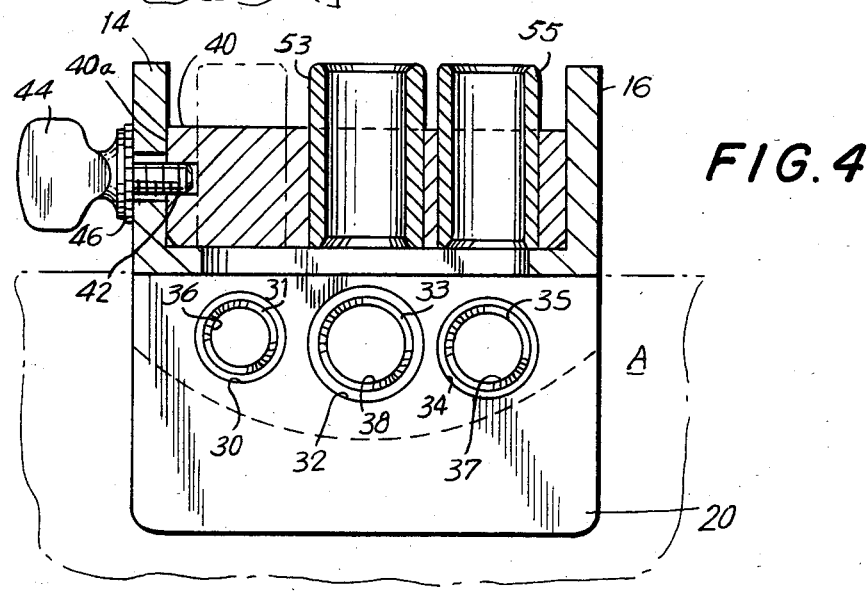
FIG. 4 is an enlarged sectional view taken along line 4—4 of FIG. 2.

The use of dowel jig 10 for L-doweling will now be described. The first and second boards to be joined are placed in the position in which they are to be doweled and are appropriately marked to indicate the manner in which the boards are to be joined. That is, one of the boards will be receiving dowel holes on one of its surfaces whereas the other board will be receiving corresponding dowel holes in its edge. The first board to receive dowel holes on its surface will be designated as A and the second board will be designated as B as depicted in FIGS. 2 through 4.

Pin 62 is inserted in opening 60 and board A is placed against wall 20 with its edge a' against surfaces 14a and 16a of rails 14 and 16. Slide jig 40 is slid so that pin 62 presses board A against wall 20 as best depicted in FIG. 3. Thumb screw 44 is then tightened to lock slide jig 40 in position. In order to facilitate removal of pin 26, board A is removed and placed back in the same position. Board B is then placed against board A and screw 26 is tightened to clamp the two boards against wall 20 as seen in FIG. 3. The boards should be clamped together by separate clamp or vise to prevent their relative movement while the dowel jig is repositioned for each set of holes. The appropriate hole 36, 37 or 38 is selected and a hole is drilled in the surface of board A using a drill bit inserted through the chosen hole. A corresponding hole is selected from holes 56b, 57b and 58b and then a hole is drilled in the edge of board B. Screw 26 is loosened and dowel jig 10 is moved to the next position where corresponding holes are to be drilled and the same procedure as discussed above is followed.

For edge-to-edge doweling, the same procedure as described above for L-doweling is following except that sets of holes Y and Z on slide jig 40 are utilized. An appropriate sized hole is selected from set Y and utilized for guiding a drill bit to drill a hole in the edge of board A. A corresponding hole is selected from set Z and used to guide a drill bit to drill a corresponding hole in board B.

By clamping boards or workpieces to be doweled flat and even together without interference or spacers therebetween or requiring the boards to be clamped at right angles to each other, the dowel operation is much more easily performed than with any prior art dowel jig.

Figure 5:
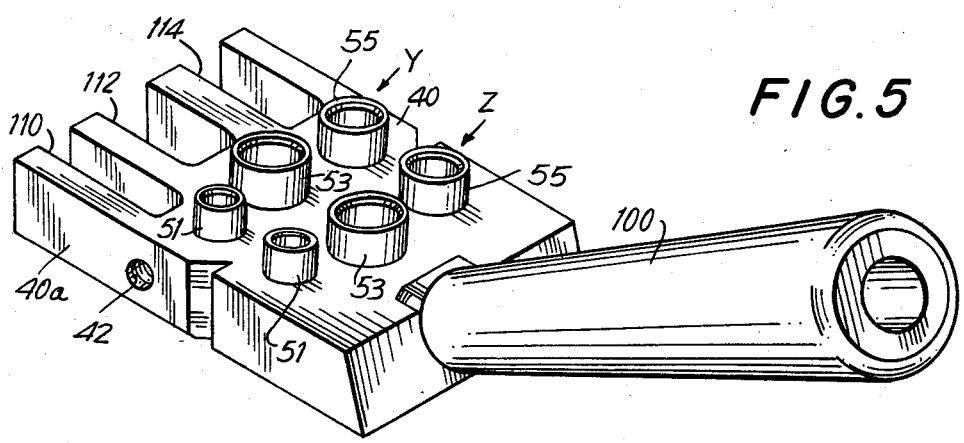
FIG. 5 is a perspective view of the slide jig shown removed from the frame of the dowel jig with its auxilliary handle shown attached thereto.

For recessed or T-doweling, only board A is inserted and clamped in dowel jig 10. Holes are drilled along the edge of board A using the appropriate sized hole in set Y of holes in slide jig 40. Thereafter, board A is removed from the dowel jig and dowels are inserted in the drilled openings. Second member or slide jig 40 is removed from first member 12 by removing thumb screw 44. A handle 100 depicted in FIG. 5 is screwed into threaded opening 102 in slide member 40. Slide member 40 is provided with a set of three slots 110, 112 and 114 which correspond in position and width to the holes in slide member 40. Where board A is to be joined to board B, a line is drawn on board B. While baseline of slide member 40 is placed even with the line drawn on board B, board A with dowels inserted is clamped flat on top of board B, flush against the slotted end of slide member 40 and parallel to the line drawn on board B. The boards should then be clamped in this position. Choosing the appropriate sized hole and slot, slide jig 40 is pressed against the edge of board A from which the dowels protrude with a given dowel extending into the proper slot 110, 112 or 114. Then, a corresponding hole is drilled on the surface of board B utilizing the set Y of holes in slide jig 40. Handle 100 is utilized to hold slide member 40 so that it can be pressed against the edge of board A. This procedure is repeated for each dowel inserted so that corresponding openings can be drilled in a recessed surface portion of board B.

In accordance with the present invention, a multipurpose dowel jig is disclosed which provides, in a single tool, the appropriate design necessary for drilling corresponding dowel holes in boards to be joined together by doweling. The device is inexpensive and easy to manufacture yet provides a plurality of functions and is readily utilizable by both the skilled artisan and the unskilled.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween:

What is claimed is:

1. A dowel jig for positioning first and second workpieces to permit the drilling of corresponding dowel holes therein comprising a first member having a flat surface and a wall extending essentially perpendicular to said flat surface, said wall including at least a first bore hole therein of a predetermined diameter having a center spaced a predetermined distance from said flat surface which defines an axis extending essentially parallel to said flat surface, a second member slideably supported on said first member adjacent said flat surface and slideable in the direction of said axis, said second member having an upper surface facing said flat surface of said first member, said second member including at least second and third bore holes therein of substantially the same diameter as said predetermined diameter of said first bore hole defining a center line, said second and third bore holes each having a center spaced from said center line on opposite sides thereof by said predetermined distance, said second and third bore holes each defining an axis, the axes of said second and third bore holes extending essentially perpendicular to and intersecting said axis of said first bore hole in said first member, and locking means for releasebly locking said second member at a desired position with respect to said wall of said first member to permit simultaneous drilling of two aligned holes in the edges of said first and second workpieces through said second and third bore holes, respectively, to permit said workpieces to be joined at their edges.

2. The dowel jig as claimed in claim 1, wherein said first member includes clamping means for clamping said first and second workpieces together against said wall of said first member.

3. The dowel jig as claimed in claim 2, wherein said first bore hole in said wall of said first member is spaced a predetermined distance from said flat surface to permit a hole to be drilled in the surface of said first workpiece at a predetermined distance from the edge of said first workpiece.

4. The dowel jig as claimed in claim 2, wherein said second and third bore holes in said second member are spaced a predetermined distance apart along said axis of said first bore hole to permit holes to be drilled simultaneously in the side edges of said first and second workpieces at predetermined distances from the edges of said side edges.

5. The dowel jig as claimed in claim 1, wherein said wall includes two additional bore holes therein spaced laterally thereacross with said first bore hole, said three bore holes in said wall each having a different diameter, each said bore hole in said wall being spaced a predetermined distance from said flat surface.

6. The dowel jig as claimed in claim 5, wherein said second member includes two additional bore holes laterally aligned with said second bore hole and two additional bore holes laterally aligned with said third bore hole.

7. A dowel jig for positioning first and second workpieces to permit the drilling of corresponding dowel holes therein comprising a first member having a flat surface and a wall extending essentially perpendicular to said flat surface, said wall including at least a first bore hole therein of a predetermined diameter which defines an axis extending essentially parallel to said flat surface, a second member slideably supported on said first member adjacent said flat surface and slideable in the direction of said axis, said second member having an upper surface facing said flat surface of said first member, said second member including at least second and third bore holes therein of substantially the same diameter as said predetermined diameter of said first bore hole, said second and third bore holes each defining an axis, the axes of said second and third bore holes extending essentially perpendicular to and intersecting said axis of said first bore hole in said first member, and locking means for releaseably locking said second member at a desired position with respect to said wall of said first member to permit simultaneous drilling of two aligned holes in the edges of said first and second workpieces through said second and third bore holes, respectively, said wall including two additional bore holes therein spaced laterally thereacross with said first bore hole, said three bore holes in said wall each having a different diameter, each said bore hole in said wall being spaced a predetermined distance from said flat surface, said second member including two additional bore holes laterally aligned with said second bore hole and two additional bore holes laterally aligned with said third bore hole, said upper surface defining an imaginary base line extending transversly thereacross essentially perpendicular to the axis of said first bore hole, each bore hole in said wall including a corresponding bore hole on one side of said base line and a corresponding bore hole on the other side of said base line, each said set of corresponding bore holes having substantially equal diameters, said corresponding bore holes in said second member having axes which extend essentially perpendicular to and intersect the corresponding bore hole on said wall.

8. A dowel jig for positioning first and second workpieces to permit the drilling of corresponding dowel holes therein comprising a first member having a flat surface and a wall extending essentially perpendicular to said flat surface, said wall including at least a first bore hole therein of a predetermined diameter which defines an axis extending essentially parallel to said flat surface, a second member slideably supported on said first member adjacent said flat surface and slideable in the direction of said axis, said second member having an upper surface facing said flat surface of said first member, said second member including at least second and third bore holes therein of substantially the same diameter as said predetermined diameter of said first bore hole, said second and third bore holes each defining an axis, the axes of said second and third bore holes extending essentially perpendicular to and intersecting said axis of said first bore hole in said first member, and locking means for releaseably locking said second member at a desired position with respect to said wall of said first member to permit simultaneous drilling of two aligned holes in the edges of said first and second workpieces through said second and third bore holes, respectively, said second member including an opening and a pin removably insertable in said opening, said pin acting to press against said first workpiece so that the distance of said second member from said wall can be readily determined, said locking means being manipulatable to lock said second member in the position where said pin presses against said first workpiece.

9. The dowel jig as claimed in claim 1, wherein said flat surface includes first and second rails joined to said wall and extending essentially perpendicular thereto, said first and second rails being spaced apart to define a cutout portion therebetween, said first and second rails each having an upper flat surface against which the edges of said first and second workpieces abut when in said jig, said second member being supported on the underside of said first and second rails and being exposed through said cutout.

10. The dowel jig as claimed in claim 9, wherein said first rail includes a side, said side including a slot, said second member including a threaded opening which is exposed through said slot, said locking means including a screw threaded in said threaded opening and extending through said slot for locking said second member in a desired position.

11. The dowel jig as claimed in claim 1, wherein said second member is removable from said first member, said second member, when removed from said first member including a handle means releaseably securable thereto, said second member including at least one slot formed therein in alignment with said second and third bore holes and having a width substantially equal to the diameter of said second and third bore holes.

12. The dowel jig as claimed in claim 7, wherein each said bore hole includes a drill bushing secured therein.

13. A dowel jig comprising a first member having a flat surface and a wall extending essentially perpendicular to said flat surface, said wall including a first set of three bore holes each of a different predetermined diameter which are spaced transversely across said wall, the center of each said bore hole being spaced a predetermined distance from said flat surface, each said bore hole defining an axis, a second member removably slidably supported adjacent said flat surface and defining an imaginary base line extending transversely thereacross, said second member including a second set of three bore holes spaced apart on one side of said base line and a third set of three bore holes spaced apart on the other side of said base line, each said bore hole in said first set including a corresponding bore hole of said corresponding different predetermined diameter in each said second and third sets of bore holes such that the axis of a given one of said bore holes in said first set is perpendicular to and intersects the axes of the corresponding bore holes in said second and third sets, the centers of each corresponding bore hole in said second and third sets of bore holes being spaced from said base line by said predetermined distance of said corresponding bore hole in said first set of bore holes, said second member including a set of three slots in an edge thereof, each said slot being in alignment with one said corresponding bore hole in said second and third sets, and locking means for locking said second member in a given position when in said first member, said locking means permitting said second member to be removed from said first member.

14. The dowel jig as claimed in claim 13, and including clamping means for clamping workpieces against said wall of said first member.

15. The dowel jig as claimed in claim 14, wherein said second member includes handle means removably securable to said second member when said second member is removed from said first member for holding said second member.

16. The dowel jig as claimed in claim 15, wherein said second member includes an opening adjacent said base line on the side opposite said wall, and a pin removably insertable in said opening.

17. The dowel jig as claimed in claim 16, wherein each said bore hole includes a drill bushing fitted therein.

18. The dowel jig as claimed in claim 17, wherein said flat surface includes first and second rails each having a flat upper surface extending essentially perpendicular to said wall, said first and second rails being spaced to define a cutout portion therebetween, said second and third sets of openings being exposed through said cutout portion.

19. A dowel jig for positioning first and second workpieces to permit the drilling of corresponding dowel holes therein comprising a first member having a flat surface and a wall extending essentially perpendicular to said flat surface, said wall including at least a first bore hole therein of a predetermined diameter which defines an axis extending essentially parallel to said flat surface, a second member slideably supported on said first member adjacent said flat surface and slideable in the direction of said axis, said second member having an upper surface facing said flat surface of said first member, said second member including at least second and third bore holes therein of substantially the same diameter as said predetermined diameter of said first bore hole, said second and third bore holes defining a center line extending therebetween, said second and third bore holes each defining an axis, the axes of said second and third bore holes extending essentially perpendicular to and intersecting said axis of said first bore hole in said first member, and locking means for releaseably locking said second member at a desired position with respect to said wall of said first member to permit simultaneous drilling of two aligned holes in the edges of said first and second workpieces through said second and third bore holes, respectively, said second member including pressing means for pressing said first workpiece against the wall of said first member to locate said center line at the edge of said first workpiece.

* * * * *